(12) United States Patent
Vo et al.

(10) Patent No.: US 11,755,625 B2
(45) Date of Patent: Sep. 12, 2023

(54) AGGREGATION OF NOISY DATASETS INTO MASTER FIRMOGRAPHIC DATABASE

(71) Applicant: 6SENSE INSIGHTS, INC., San Francisco, CA (US)

(72) Inventors: Tai Vo, Orange, CA (US); Nitin Vijayvargiya, San Francisco, CA (US); Daniel Hsiung, San Jose, CA (US); Premal Shah, Union City, CA (US); Viral Bajaria, San Francisco, CA (US); Akshara Palakodety, Mountain View, CA (US)

(73) Assignee: 6Sense Insights, Inc., San Franciso, CA (US)

( * ) Notice: Subject to any disclaimer, the term of this patent is extended or adjusted under 35 U.S.C. 154(b) by 144 days.

(21) Appl. No.: 17/362,843

(22) Filed: Jun. 29, 2021

(65) Prior Publication Data
US 2021/0406285 A1  Dec. 30, 2021

Related U.S. Application Data

(60) Provisional application No. 63/045,707, filed on Jun. 29, 2020.

(51) Int. Cl.
| | |
|---|---|
| *G06F 16/28* | (2019.01) |
| *G06F 16/21* | (2019.01) |
| *G06F 16/215* | (2019.01) |
| *G06F 16/2455* | (2019.01) |
| *G06F 16/22* | (2019.01) |

(52) U.S. Cl.
CPC .......... *G06F 16/285* (2019.01); *G06F 16/211* (2019.01); *G06F 16/215* (2019.01); *G06F 16/2272* (2019.01); *G06F 16/24556* (2019.01)

(58) Field of Classification Search
CPC .............. G06F 16/285; G06F 16/2272; G06F 16/24556; G06F 16/215; G06F 16/211
See application file for complete search history.

(56) References Cited

U.S. PATENT DOCUMENTS

| | | |
|---|---|---|
| 2006/0206344 A1 | 9/2006 | Au |
| 2007/0100996 A1 | 5/2007 | Stebbins |

(Continued)

OTHER PUBLICATIONS

International Search Report in PCT/US20210039681, dated Sep. 16, 2021.

*Primary Examiner* — Huawen A Peng
(74) *Attorney, Agent, or Firm* — PROCOPIO, CORY, HARGREAVES & SAVITCH

(57) ABSTRACT

Aggregation of noisy datasets into a master firmographic database. In an embodiment, firmographic records are received from a plurality of sources, and normalized into a common schema. One or more firmographic records may be cleaned by replacing a value of one or more fields in those firmographic record(s) with a value of those field(s) in another firmographic record. The firmographic records may then be clustered, and each of the clusters may be collapsed into a single conflated firmographic record based on a voting process. A master identifier may be generated for each conflated firmographic record, and the conflated firmographic records may be merged into a master firmographic database that is indexed by master identifiers.

17 Claims, 3 Drawing Sheets

(56) References Cited

U.S. PATENT DOCUMENTS

| | | |
|---|---|---|
| 2008/0027788 A1 | 1/2008 | Lawrence et al. |
| 2009/0204569 A1* | 8/2009 | Bowden ............... G06F 16/951 706/56 |
| 2010/0121684 A1 | 5/2010 | Morio et al. |
| 2012/0232955 A1* | 9/2012 | Riazzi ............... G06Q 30/0204 705/7.32 |
| 2013/0124524 A1* | 5/2013 | Anderson ........... G06F 16/3338 707/737 |
| 2015/0006248 A1 | 1/2015 | Li et al. |
| 2017/0039258 A1* | 2/2017 | Shah .................... G06F 16/258 |
| 2018/0025041 A1* | 1/2018 | Gray ..................... G06F 16/23 707/803 |

* cited by examiner

AGGREGATION OF NOISY DATASETS INTO MASTER FIRMOGRAPHIC DATABASE

CROSS-REFERENCE TO RELATED APPLICATIONS

This application claims priority to U.S. Provisional Patent App. No. 63/045,707, filed on Jun. 29, 2020, which is hereby incorporated herein by reference as if set forth in full.

In addition, this application is related to U.S. Pat. No. 9,202,227, issued on Dec. 1, 2015, U.S. Pat. No. 10,475,056, issued on Nov. 12, 2019, and U.S. Pat. No. 10,536,427, issued on Jan. 14, 2020, which are all hereby incorporated herein by reference as if set forth in full. This application is also related to U.S. Provisional Patent App. No. 63/045,731, filed on Jun. 29, 2020, and U.S. Provisional Patent App. No. 63/045,693, filed on Jun. 29, 2020, which are both hereby incorporated herein by reference as if set forth in full.

BACKGROUND

The embodiments described herein are generally directed to data curation, and, more particularly, to the aggregation of noisy datasets into a master firmographic database.

SUMMARY

Accordingly, systems, methods, and non-transitory computer-readable media are disclosed for the aggregation of noisy datasets, which may also be numerous, large, and arbitrarily overlapping, into a master firmographic database. For example, a platform is disclosed that aggregates noisy datasets to build a database of accurate firmographic profiles of business entities, by collecting, normalizing, filtering, cleaning, supplementing, and deduplicating firmographic records, voting on values for fields in those firmographic records, and accounting for the accuracy of each source of the firmographic records.

In an embodiment, a method is disclosed that comprises using at least one hardware processor to: receive data comprising a plurality of firmographic records from a plurality of sources, wherein each of the plurality of firmographic records comprises a plurality of fields; normalize the plurality of firmographic records into a common schema; clean the plurality of firmographic records by replacing a value of each of one or more of the plurality of fields in one or more of the plurality of firmographic records with a value of that field in another one of the plurality of firmographic records; cluster the plurality of firmographic records into a plurality of clusters, wherein each of the plurality of clusters comprises a subset of the plurality of firmographic records; for each of the plurality of clusters, collapse the subset of firmographic records in that cluster into a single conflated firmographic record based on a voting process within that cluster; generate a master identifier for each conflated firmographic record; and merge the conflated firmographic records into a master firmographic database, comprising a plurality of mastered firmographic records, indexed by the master identifiers.

The method may further comprise using the at least one hardware processor to, after receiving the data and prior to clustering the plurality of firmographic records, filter the plurality of firmographic records according to one or more exclusion criteria. The method may further comprise using the at least one hardware processor to: identify a subset of the plurality of mastered firmographic records that is associated with a user; and provide the identified subset to the user. Normalizing the plurality of firmographic records into a common schema may comprise standardizing values of one or more of the plurality of fields in the plurality of firmographic records.

Cleaning the plurality of firmographic records may comprise: classifying each of the plurality of firmographic records into one of a plurality of categories, wherein the plurality of categories comprises a strong category and a weak category; and, for each of one or more of the plurality of firmographic records that are classified into the weak category, replace the value of each of one or more of the plurality of fields in that firmographic record with the value of that field in one of the plurality of firmographic records that is classified into the strong category. The plurality of categories may further comprise a neutral category, wherein none of the values of the plurality of fields in the plurality of firmographic records that are classified into the neutral category are replaced during the cleaning. Classifying each of the plurality of firmographic records into one of a plurality of categories may comprise, for each of the plurality of firmographic records: calculating a first strength of a first value for a first field in the firmographic record within a first dimension defined by a second value for a second field in the firmographic record and a third value for a third field in the firmographic record; calculating a second strength of the second value within a second dimension defined by the first value and the third value; when the first strength and the second strength both satisfy a respective strong criterion, classifying the firmographic record into the strong category; when the first strength and the second strength both satisfy a respective weak criterion, classifying the firmographic record into the weak category; and, when the first strength and the second strength do not both satisfy the respective strong criterion and do not both satisfy the respective weak criterion, classifying the firmographic record into the neutral category. The first field may be a domain name, and the second field may be a company name. The third field may be a country. The strong criterion may be a first threshold value, and the weak criterion may be a second threshold value that is different than the first threshold value. Calculating the first strength may comprise calculating a histogram weight indicating a frequency that the first value for the first field occurs in the plurality of firmographic records in the first dimension, wherein calculating the second strength comprises calculating a histogram weight indicating a frequency that the second value for the second field occurs in the plurality of firmographic records in the second dimension.

Clustering the plurality of firmographic records into a plurality of clusters may comprise, for each of a plurality of values of a key, grouping the plurality of firmographic records having that value of the key into a cluster. The plurality of fields may comprise a domain name and a company name, wherein, for each of the plurality of firmographic records, the value of the key for that firmographic record is determined as: when the firmographic record comprises a value for the domain name, the value for the domain name; and, when the firmographic record does not comprise a value for the domain name, a value for the company name.

Clustering the plurality of firmographic records into a plurality of clusters may comprise, for each of a plurality of values of a key and each of a plurality of values of at least one of the plurality of fields, grouping the plurality of firmographic records having that value of the key and that value of the at least one field into a cluster. The at least one field may comprise one or more of a country, state, or city.

The plurality of fields may comprise a domain name and a company name, wherein generating the master identifier for each conflated firmographic record comprises: when the conflated firmographic record comprises a value for the domain name, generating the master identifier as a function of the value for the domain name; and, when the conflated firmographic record does not comprise a value for the domain name, generating the master identifier as a function of a value for the company name.

The plurality of fields may comprise a domain name and a company name, wherein generating the master identifier for each conflated firmographic record comprises: when the conflated firmographic record represents a franchiser, when the conflated firmographic record comprises a value for the domain name, generating the master identifier as a function of the value for the domain name, and, when the conflated firmographic record does not comprise a value for the domain name, generating the master identifier as a function of a value for the company name; and, when the conflated firmographic record represents a franchisee, generating a subordinate identifier as a function of the value for the company name, and generating the master identifier as a function of the master identifier of a franchiser of the franchisee and the subordinate identifier.

The method may further comprise using the at least one hardware processor to, before merging the conflated firmographic records into the master firmographic database, filtering out each of one or more of the conflated firmographic records based on a reliability of the plurality of sources that contributed the subset of firmographic records that were collapsed into that conflated firmographic record.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for the aggregation of noisy datasets into a master firmographic database. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
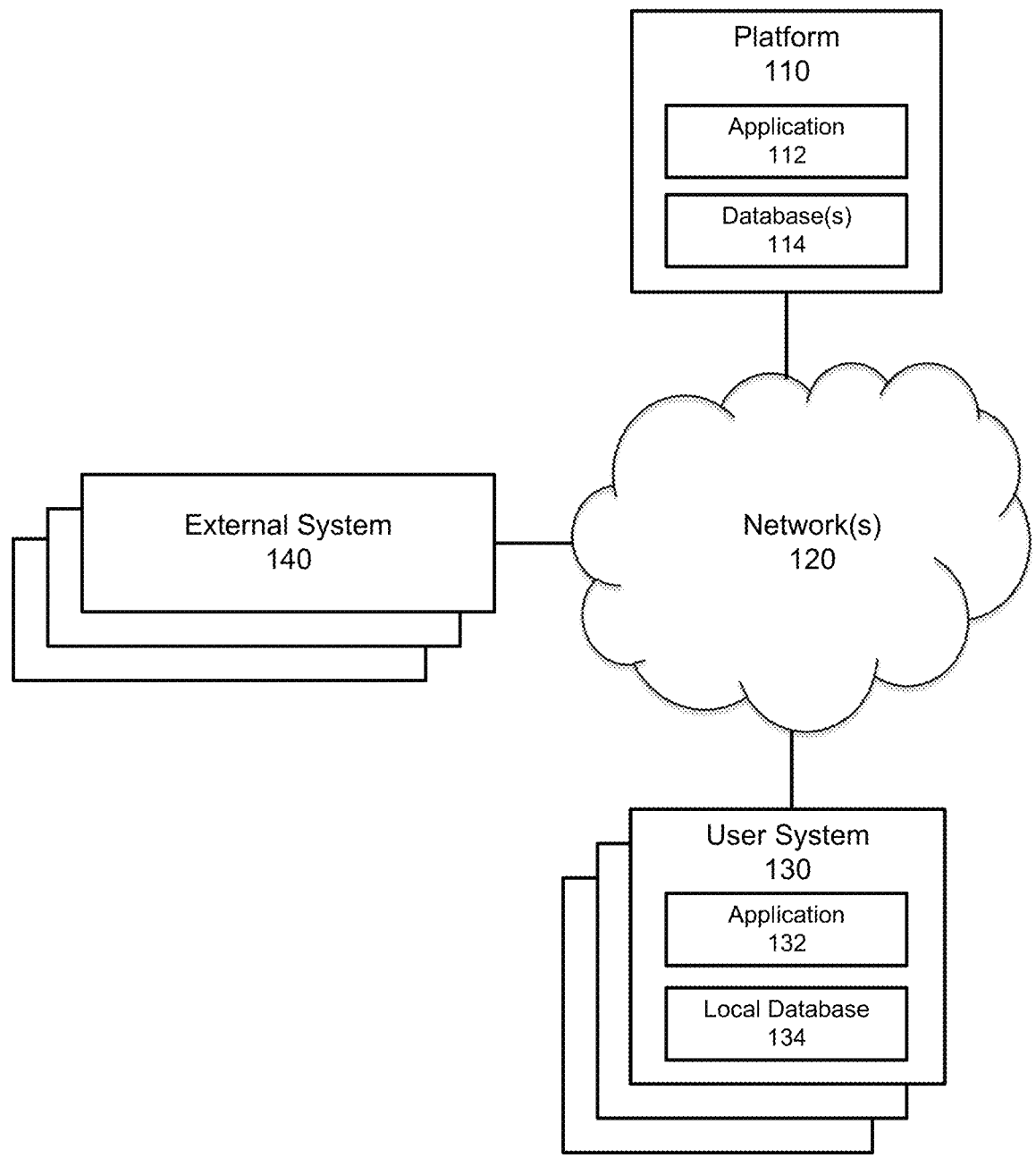
FIG. 1 illustrates an example infrastructure, in which one or more of the processes described herein, may be implemented, according to an embodiment.

FIG. 1 illustrates an example infrastructure in which the disclosed processes may operate, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the functions, processes, or methods of the application described herein.

1.2. Example Processing Device

Figure 2:
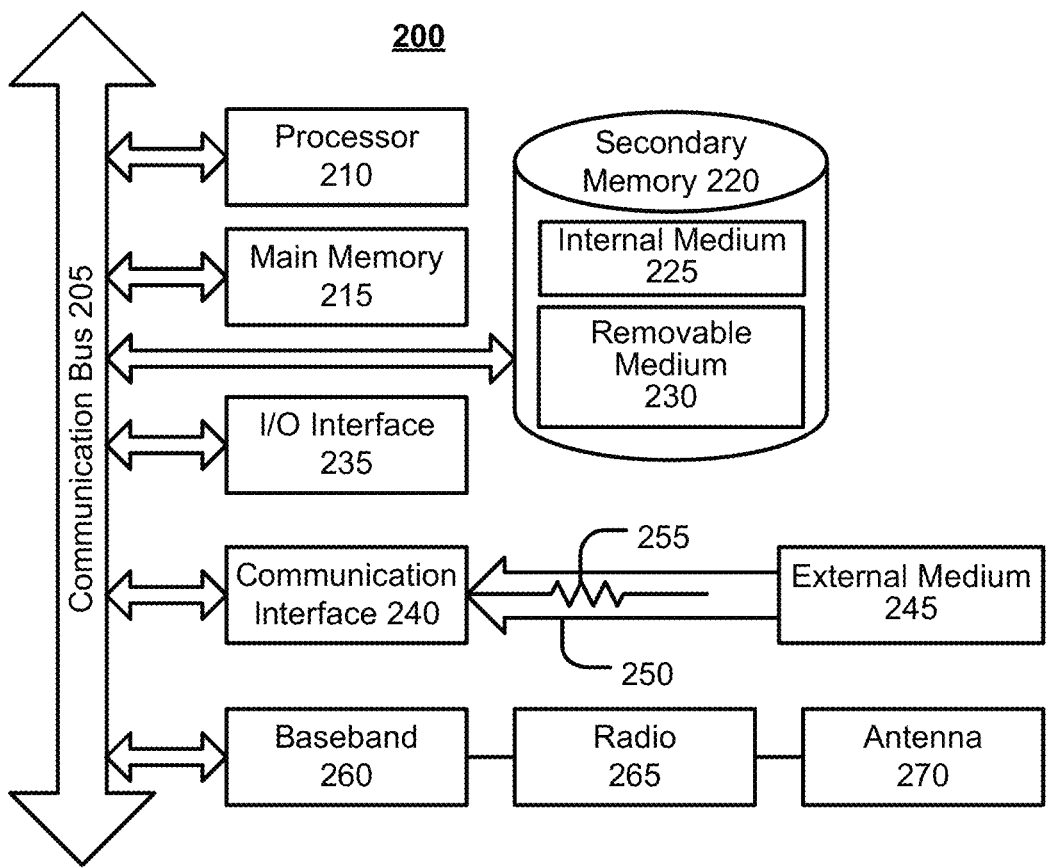
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Process Overview

Embodiments of processes for the aggregation of noisy datasets into a master firmographic database will now be described in detail. It should be understood that the described processes may be embodied in one or more software modules that are executed by one or more hardware processors (e.g., processor 210), e.g., as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Data Merging

Figure 3:
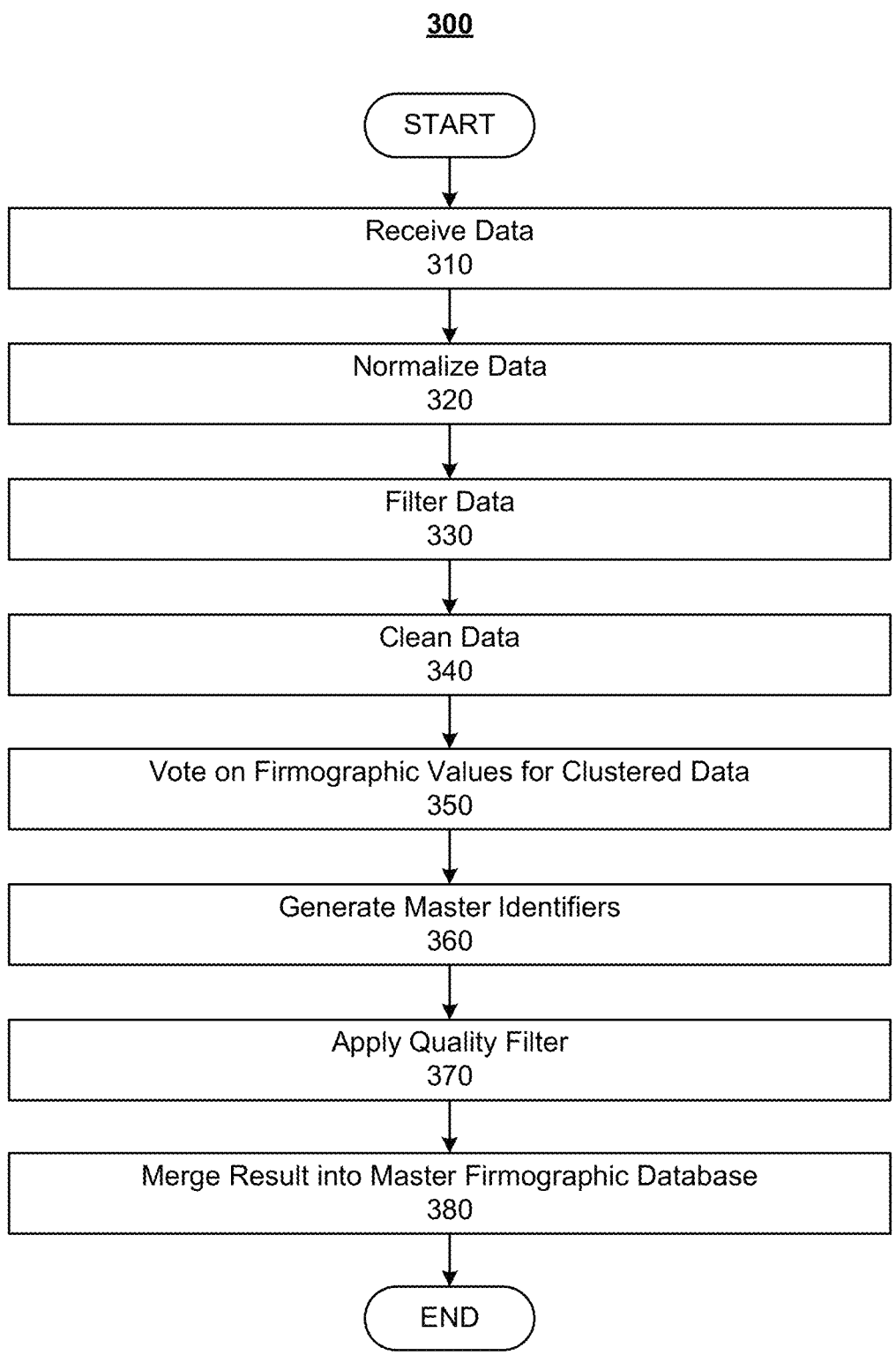
FIG. 3 illustrates an example process for merging data into a master firmographic database, according to an embodiment.

FIG. 3 illustrates an example process 300 for aggregating and merging firmographic data into a master firmographic database, according to an embodiment. Process 300 may be implemented by the disclosed application, for example, as one or more software modules of server application 112, comprising instructions executed by one or more processors 210 of platform 110, and/or one or more software modules of client application 132, comprising instructions executed by one or more processors 210 of user system 130. It should be understood that one or more subprocesses of process 300, including, for example, subprocesses 320, 330, 340, and/or 370, may be omitted in various embodiments.

Initially, in subprocess 310, data is received. In the event that a master firmographic database already exists, the received data represent update data. Otherwise, if a master firmographic database does not already exist, the received data may represent initialization data. This data may be received from one or more sources (e.g., external system(s) 140), and, in a typical implementation, the data may be received from a plurality of sources. The data may be received periodically from the source(s) (e.g., hourly, daily, or at any other interval) or as a real-time stream of data as it is collected by the source(s). The data may be received from different sources at different timings. Examples of potential sources include, without limitation, customer relationship management (CRM) systems, marketing automation platform (MAP) systems, IP-to-company mapping systems, proprietary systems (e.g., offered by 6Sense Insights, Inc., of San Francisco, Calif., U.S.A.), vendor systems, and/or the like.

The received data may comprise firmographic information that has been collected about one or more companies. As used herein, the term "company" refers to any entity that conducts business or may purchase a product or service, including legal entities, such as a corporation, partnership, educational institution (e.g., school, college, university, etc.), government institution, non-profit organization, and sole proprietorship. The firmographic information for a given company may comprise one or a plurality of firmographic records, with each record comprising values for a plurality of fields that describe various attributes of that company (e.g., size, revenue, website address, IP address, domain name, business address, telephone number, social media identifier, industry code, etc.). The firmographic information may be organized as rows and columns, for example, with each row representing a firmographic record for a single company, and each column representing a value of a field in that firmographic record.

In subprocess 320, the data, received in subprocess 310, may be normalized. Since the data may be received from a plurality of different sources, the data may be received in different source schemas (e.g., formats, layouts, field names, value ranges, data types, etc.). Accordingly, all of the received data may be converted to a common schema. For example, each source may be associated with a mapping that maps the source's schema to the common schema. Thus, fields from the layout of the received data may be mapped to fields in the layout of the common schema. The mapping for a particular source schema to the common schema may be generated as part of the on-boarding process for that source (i.e., at the time that the source is introduced to the application of platform 110).

In addition, the values of at least some fields in the received data may be normalized to common sets of values in the common schema. For example, a value of a field in the source data that is represented as ranges in the common schema may be mapped from the source data to the appropriate range (e.g., a revenue value of $4,000,000 for a particular company in the source data may be mapped into a range value of $1,000,000-$5,000,000 in the common schema). As another example, a value of a field that is represented by a predefined set or enumeration of values may be mapped to the appropriate value in the set of values (e.g., a location value of "US" or "USA" in the source data may be mapped to a value of "United States" in the common schema).

Furthermore, the values of one or more fields (e.g., business address, telephone number, social media identifier, etc.) may be converted into a standardized format. For instance, all format variations in the values of a field can be converted to a single standard format for that field. It should be understood that the particular variation to be used as the standard format is not important, as long as all values are converted into the same standard format. As an example, "123 Main St." and "123 Main Street" should be converted into the same standardized format for addresses (e.g., "123 main street"). Similarly, "800-555-1234" and "1(800) 555.1234" should be converted into the same standardized format for telephone numbers (e.g., 800-555-1234). As yet another example, "INTEL CORP." and "Intel Corporation" should be converted into the same standardized format for company names (e.g., INTEL). Notably, in the case of company names, the standardized value may consist of all capitalized letters and omit trailing terms, such as legal designations (e.g., "Co.", "Corp.", "Inc.", "LLC", etc.). The standardization of field values reduces noise within the source data and facilitates the identification of matching values in a given field, for example, to calculate statistics for the data (e.g., the number of occurrences of each of a plurality of different values in a given field). The standardization of field values for certain fields (e.g., domain name and company name) may also facilitate the generation of master identifiers discussed elsewhere herein.

In subprocess 330, the data, received in subprocess 310 (e.g., and normalized in subprocess 320), may be filtered. For example, undesirable records may be filtered out using one or more exclusion criteria. These exclusion criteria may be implemented as exclusion lists or "blacklists." Exclusion list(s) may comprise platform-wide list(s) (e.g., curated by an operator of platform 110) and/or user-specific list(s) (e.g., curated by one or more users of platform 110). It should be understood that a user-specific exclusion list may apply only to the specific user (e.g., only to firmographic information provided by that user or for that user), whereas a platform-wide exclusion list may apply universally to all users (e.g., to firmographic information provided by all users or for all users). The exclusion list(s) may comprise values for one or more fields in the common schema that will exclude a firmographic record in the data from being further processed. In other words, the firmographic record may be deleted from the data pipeline represented by process 300. In an embodiment, the exclusion criteria are set conservatively to only exclude clearly erroneous or otherwise undesirable firmographic records.

For example, firmographic records comprising certain IP addresses or domain names or tuples of fields, such as (mailing address, domain name), (telephone number, domain name), (social media identifier, domain name), and/or the like may be excluded. Some of these exclusions may be manually added to an exclusion list to quickly address known bad data. For example, an exclusion list may comprise a clearly erroneous company name and domain name tuple of ("Intel Corp.", hp.com), such that firmographic records comprising this tuple are excluded from further processing. Other exclusions may be automatically or manually added to an exclusion list based on statistics (e.g., a histogram representing the distribution of the values of a given field over domain names). For instance, firmographic records with addresses, telephone numbers, and/or social media identifiers (e.g., social media links or handles) that strongly co-occur with multiple domain names may be excluded. As a specific example, if the mailing address "123 Main Street, Los Angeles, Calif." has a significant histogram weight within the address distribution over multiple domain names, it is unlikely that a single domain name can be deduced from this mailing address. The same is likely true for the telephone number "123-456-7890", and similar examples can be given for social media identifiers and other fields. In other words, if the distribution of a value of a field within the data indicates that it is unlikely to enable the deduction of a single company from that value, that field value may be added to an exclusion list, such that firmographic records with that field value are excluded from further processing. This prevents the magnification of bad input data.

As another example, the exclusion criteria may exclude firmographic records that are clearly erroneous. Clearly erroneous firmographic records may include those comprising curse words in one or more fields, those with one or more fields that match patterns or regular expressions indicative of junk, and/or those with one or more fields that do not satisfy the requirements of a field value. For example, a firmographic record may be excluded if the firmographic record comprises a domain name that does not include a top-level domain (e.g., does not include a ".com", ".net", ".org", etc.), a company name that includes a term or pattern indicative of junk (e.g., "TEST CORP", "TESTACCOUNT", "NOTACOMPANY", "WEBTRIAL", etc.), a telephone number that includes an invalid pattern (e.g., "1234567890", "1111", etc.), and/or the like.

In subprocess 340, the data, received in subprocess 310 (e.g., and remaining after filtering in subprocess 330), may be cleaned. Cleaning may comprise removing and/or supplementing data. Statistical properties of the data may be used to clean the data and, where possible, populate the values of blank fields in the data. The cleaning may be performed conservatively to avoid the introduction of noise or the accidental augmentation of bad data signals. In practice, the data may include many blank fields and outright errors (e.g., in the domain name, company name, and country fields). Because these fields can be crucial to the generation of master identifiers used for indexing in the master firmographic database, subprocess 340 may include one or more, including potentially all, of the following subprocesses to fill in and correct the values of fields in the data.

In a first subprocess, the histogram weight of each value in one or more normalized fields (e.g., business address, telephone number, social media identifier, etc.) may be computed, and blank fields can be filled in with values based on the computed histogram weights. The histogram weight of a given field value may be defined as the percentage of times that value appears in the field over the entire distribution of values in that field. For example, consider the following distribution of values in the business address field for the domain name "Chobani.com":

| Standardized Mailing Address | Weight (% of histogram distribution) |
|---|---|
| 147 state highway 320, Norwich, NY | 64.2 |
| 3450 kimberly road, Twin Falls, ID | 7.7 |
| 72 spring street, New York City, NY | 5.2 |
| 201 south college street, Charlotte, NC | 2.1 |
| . . . | <2.0 each |

It should be understood that this subprocess is more efficiently performed on the normalized data, produced by subprocess 320, since the computation of the histogram weights should consider all of the various formats of the same value as the same value, instead of as separate values. Based on the computed histogram weights above, the application can infer that "147 state highway 320, Norwich, N.Y." is the mailing address that corresponds to the domain name "Chobani.com". Thus, the application may automatically fill in a blank domain field with the value "Chobani.com", in any firmographic records comprising the value "147 state highway 320, Norwich, N.Y." in the address field. When combined with other clues, such as telephone number, the company's social media identifier, company name, and/or the like, the strength of this automatic filling strategy increases significantly.

In a second subprocess, the strength of one or more field tuples may be computed. In an embodiment, the following three fields are used: domain name (D); company name (N); and country (C). For example, the strength of all possible tuples of (domain name, country), (company name, country), and (domain name, company name, country) may be computed. The strength S of each DNC tuple—i.e., the tuple of (domain name, company name, country)—may be calculated according to the following function $f$:

$$S = f(n, \omega_{DC}, \omega_{NC})$$

wherein n is the frequency of the DNC tuple within the data, $\omega_{DC}$ is the relative weight of the DNC tuple within the DC dimension that includes that DNC tuple, and $\omega_{NC}$ is the relative weight of the DNC tuple within the NC dimension that includes that DNC tuple. It should be understood that the relative weights $\omega_{DC}$ and $\omega_{NC}$ may each be calculated as the ratio or percentage that the DNC tuple appears in the respective dimension relative to the total size of the respective dimension.

The strength S that is calculated for each DNC tuple may be compared to one or more threshold values to determine whether the DNC tuple is strong (e.g., should be kept in the data pipeline and/or used to fill in blank or weak values for that tuple) or weak (e.g., should not be used to fill in blank values for that tuple and/or should be replaced with a strong tuple when occurring in a firmographic record). The threshold value(s) to be used may be determined empirically, and may be set conservatively so as to significantly reduce the probability of false negatives (i.e., strong tuples being classified as weak tuples). For example, in one particular implementation, experiments were done on over two billion records to identify the threshold values for classifying DNC tuples into one of five groups: DNC tuples with strong domain name values relative to their NC dimension; DNC tuples with weak domain name values relative to their NC dimension; DNC tuples with strong company name values relative to their DC dimension; DNC tuples with weak company name values relative to their DC dimension; and neutral DNC tuples that should be left alone in order to prevent the introduction of artificial noise.

Based on the threshold values, each DNC tuple can be classified into one or more of these categories. Then, for each DNC tuple, the category(ies) into which it has been classified can be used to further classify the DNC tuple as strong, weak, or neutral. This classification can be performed by determining, for each DNC tuple:

(1) Given the DC dimension—i.e., (domain name, country)—how strong is the company name N with respect to all company names in that DC dimension; and (2) Given the NC dimension—i.e., (company name, country)—how strong is the domain name D with respect to all domain names in that NC dimension.

DNC tuples that are strong in both the DC dimension and the NC dimension may be classified as strong, whereas DNC tuples that are weak in both the DC dimension and the NC dimension may be classified as weak. DNC tuples that are weak in one of the DC dimension and the NC dimension, but strong in the other of the DC dimension and the NC dimension, may be classified as neutral. In order to prevent the magnification of weak data, DNC tuples that are classified as neutral are neither used to replace weak tuples nor replaced with strong tuples.

The particular threshold values used to differentiate between strong and weak tuples in determinations (1) and (2) above may be tunable parameters. In other words, the threshold values may be updated periodically based on the amount of data points, updated empirical data, and/or the like. As one example, the histogram weight can be used for thresholding, with histogram weight values greater than 50% classified as strong, and histogram weight values less than 15% classified as weak. The threshold values of 50% and 15% work well for distributions with ample data points. For distributions with fewer data points (e.g., for smaller companies, entities in countries for which there is not much data, etc.), different threshold values may be used, as determined by experimentation and an understanding of the data.

The table below depicts an example of the statistics in the N dimension with the DC dimension fixed to (Chobani.com, United States):

| Frequency | Domain | Standardized Company Name | Histogram Weight (%) |
|---|---|---|---|
| 5000 | Chobani.com | CHOBANI | 76.9 |
| 1350 | Chobani.com | CHOBANIGLOBALHOLDINGS | 20.8 |
| 30 | Chobani.com | CHOBANIIDAHO | <2.3 |
| 20 | Chobani.com | AGROFARMA | <2.3 |

-continued

| Frequency | Domain | Standardized Company Name | Histogram Weight (%) |
|---|---|---|---|
| 10 | Chobani.com | CHOBANIYOGURT | <2.3 |
| 10 | Chobani.com | CHOBANICOM | <2.3 |
| 5 | Chobani.com | DFEHOLDINGS | <2.3 |
| 5 | Chobani.com | ONEWORLDADVERTISING | <2.3 |
| 4 | Chobani.com | AGROFARMABRANDS | <2.3 |
| 2 | Chobani.com | CITI | <2.3 |
| ... | Chobani.com | ... | <2.3 each |

In the example above, the company name "CHOBANI" satisfies the strength threshold value of 50%, and therefore, the DNC tuple (Chobani.com, CHOBANI, United States) is partially qualified as strong. This DNC tuple can be fully qualified as strong, if the domain name "Chobani.com" also satisfies the strength threshold (e.g., histogram weight >50%) in the NC dimension (CHOBANI, United States). Notably, the tuple (Chobani.com, CHOBANI-GLOBALHOLDINGS) does not have sufficient strength to be qualified as strong (i.e., ≤50%), but does have sufficient strength (i.e., ≥15%) to avoid classification as weak. Thus, this tuple is classified as neutral, which indicates that it is unlikely to be noise, and consequently, will not be replaced with a strong tuple, but will also not be used to replace a weak tuple. The remainder of the tuples are under the weak threshold value of 15%, and therefore, are partially qualified as weak. Each of these tuples can be fully qualified as weak (e.g., noise that should be replaced), if the domain name "Chobani.com" also satisfies the weakness threshold (e.g., histogram weights <15%) in the respective NC dimension.

In an embodiment, it is especially important to clean the values of the domain name and country fields in the data, since, in an embodiment, the application generates the master identifier of a firmographic record using the values of these fields in that firmographic record. In addition, the quality of the domain name and country fields tend to be poor (e.g., comprising a DNC tuple such as (att.com, HP, US)). Thus, in an embodiment, special attention is given to clean and correct the values of the domain name fields, as discussed elsewhere herein (e.g., based on one or more statistics).

In subprocess 340, blank fields and fields that contain data that have been fully qualified as weak, can be replaced with data from DNC tuples that have been fully qualified as strong. The output of subprocess 340 is a set of clean DNC mappings of (domain name, company name, country). It should be understood that each DNC mapping maps a domain name, company name, and country to each other. The table below depicts examples of some original DNC tuples (i.e., input to subprocess 340) with their corresponding DNC mappings (i.e., output from subprocess 340):

| Input Tuple | Output Mapping |
|---|---|
| '', 'FOREST RIVER, INC', US | 'forestriverinc.com', 'Forest River', US |
| '', 'Chemist Direct', UK | 'chemistdirect.com', 'Chemist Direct', UK |
| 'v2soft.com', 'Chrysler Group', US | 'v2soft.com', 'V2Soft Inc.', US |
| 'theadventus.com', '', Singapore | 'theadventus.com', 'The Adventus Consultants', SG |
| 'ups.com', 'UPS Supply Chain Solutions - Canada', Canada | 'ups.com', 'UPS', CA |

Notably, in the example above, the tuple (v2soft.com, Chrysler Group, US) was deemed to be a weak tuple, and therefore, was replaced by a strong tuple (v2soft.com, V2Soft Inc., US). In an embodiment, pseudo-identifiers may be used to match strong firmographic records (e.g., comprising a strong DNC tuple) to weak firmographic records (i.e., comprising a weak DNC tuple). A pseudo-identifier may be a combination of a plurality of field values, including domain name, company name, country, address, telephone number, social media identifier, and/or the like. One pseudo-identifier or a plurality of different pseudo-identifiers may be generated for each firmographic record. If any pseudo-identifier of the weak firmographic record matches a pseudo-identifier of a strong firmographic record, one or more field values (e.g., the values of domain name, company name, and/or country) in the weak firmographic record may be replaced with the corresponding field values from the strong firmographic record. In an embodiment which relies on domain names and company names to generate master identifiers, at least non-matching domain names and company names in weak firmographic records are replaced with domain names and company names from strong firmographic records. This improves the quality of the master identifiers that will be generated for the firmographic records.

In subprocess 350, the data (e.g., normalized in subprocess 320, filtered in subprocess 330, and cleaned in subprocess 340) may be used in group-based or cluster-based voting to derive a set of one or more deduped or conflated firmographic records. In other words, sets of firmographic records, within each of a plurality of clusters (e.g., defined by predefined tuples), may be collapsed into a single conflated firmographic record per cluster using a voting process within the cluster. Clustering may be implemented by grouping firmographic records, for example, using the "GROUP BY" statement in Structured Query Language (SQL) or a similar mechanism in other frameworks.

In an embodiment, the firmographic records, output by subprocess 340 (e.g., normalized, filtered, and/or cleaned), are grouped into a plurality of clusters representing a plurality of levels. For example, the firmographic records may be grouped into the following levels, in which the "key" is: (i) the domain name when the firmographic record comprises a valid domain name; or (ii) the standardized company name when the firmographic does not comprise a valid domain name:

(1) Global level: GROUP BY key;
  (2) Country level: GROUP BY key, country;
  (3) State level: GROUP BY key, country, state; and
  (4) City level: GROUP BY key, country, city.

It should be understood that each group-by action will group firmographic records into clusters and, in each cluster, there may be multiple possible values for each of the non-group-by fields. For example, at the global level, all of the firmographic records are grouped such that every firmographic record in a given cluster has the same value for key (e.g., domain name or company name). However, different firmographic records in that cluster may have different values for country, state, city, industry, revenue, address, telephone number, social media identifier, and the like. Similarly, at the country level, all of the firmographic records in a given cluster will have the same value for key and country, but may have different values for any other fields. At the state level, all of the firmographic records in a given cluster will have the same value for key, country, and state, but may have different values for any other fields. At the city level, all of the firmographic records in a given cluster will have the same value for key, country, and city, but may have different values for any other fields.

In an embodiment, the application treats companies that are franchisees as a special case during the voting process. As used herein, the term "franchisee" also encompasses franchisee-like companies that, while not legally franchisees, possess the characteristics of franchisees. Similarly, the term "franchiser" encompasses true franchisers, as well as franchiser-like companies that, while not legally franchisers, possess the characteristics of franchisers. One particular characteristic of franchisees that requires special handling is that franchisees of the same franchiser tend to utilize the same domain name as the franchiser and as each other, despite being separate companies. For example, franchisees of Subway may all utilize "Subway.com" as their domain name. Similarly, franchisees of Toyota may all utilize "Toyota.com" as their domain name. Thus, for the voting in subprocess 350, franchisees may be grouped into different clusters from other franchisees and the franchiser, and the franchiser may be grouped into its own cluster. In other words, the key for a cluster representing a franchiser or franchisee may include the company name, even when a valid domain name is available (e.g., in combination with the domain name or instead of the domain name).

It should be understood that there may be multiple clusters at each group level. For example, at the global level, if there are a plurality of different values for the key, there will be a plurality of different clusters, with each cluster consisting of firmographic records with one value for the key. Similarly, at the country level, there may be a plurality of different clusters, with each cluster consisting of firmographic records with a single value for the (key, country) tuple. At the state level, there may be a plurality of different clusters, with each cluster consisting of firmographic records with a single value for the (key, country, state) tuple. At the city level, there may be a plurality of different clusters, with each group consisting of firmographic records with a single value for the (key, country, city) tuple.

Within each cluster, the application uses a voting process to, for each cluster at each group level, determine a value for each field in the firmographic record for that cluster. In other words, each cluster of firmographic records is collapsed into a single conflated firmographic record representing the entire cluster, with the conflated firmographic record comprising the determined or elected values for all fields in the firmographic record. Voting may comprise, for each cluster, electing field values based on one or more criteria. It should be understood that field values for the GROUP BY fields do not need to be elected for a cluster, since these field values will be the same for all firmographic records within the cluster. However, the values for all other fields in the resulting conflated firmographic record may be elected based on the one or more criteria. In an embodiment, the one or more criteria used for voting may comprise frequency and/or reliability of field values.

Frequency refers to the number of occurrences of the same field value within a cluster relative to the size of the cluster. In general, a field value that occurs more frequently is more likely to be elected as the field value in the conflated firmographic record than a field value that occurs less frequently. In an implementation that only uses frequency as a criterion, the voting process may comprise electing the field value that occurs the most frequently within the cluster (i.e., each firmographic record provides one vote for its value for each field). In other words, within each cluster, the most frequently occurring value for each field is elected as the value for that field in the conflated firmographic record.

Reliability refers to the reliability and/or number of source(s) that provided a given field value. Each source may be associated with a weight that indicates the reliability of the source (e.g., with higher weights indicating higher reliability). In general, a field value that occurs in a firmographic record that was provided by a source associated with greater reliability is more likely to be elected as the field value in the conflated firmographic record than a field value that occurs in a firmographic record that was provided by a source associated with lower reliability. This may be implemented by increasing and/or decreasing the number of votes that each firmographic record gets for each of its field values based on the weight associated with the source that provided that firmographic record. For example, a firmographic record that was provided by a source associated with a weight of ten may provide ten votes for its value for each field in the conflated firmographic record, whereas a firmographic record that was provided by a source associated with a weight of one half may provide half of a vote for its value for each field in the conflated firmographic record. It should be understood that the weights may be applied in different manners, as long as more reliable sources are magnified over less reliable source. Similarly, a field value that was provided or corroborated by more sources may be weighted higher (e.g., given more votes) than a field value that was provided or corroborated by fewer sources. To implement these weightings, each firmographic record may comprise or be associated with a source identifier, representing the source of the firmographic record. Thus, the source of each firmographic record (and the weight associated with that source) may be easily identified throughout process 300.

Essentially, the weights boost more reliable signals (i.e., firmographic records) in the data. In an embodiment, a weight for one or more sources may be set so as to ensure that field values in the firmographic records from those sources are virtually always elected (i.e., incorporated into the conflated firmographic record for a cluster) during the voting process. As one example, field values that have been curated by the operator of platform 110 may be weighted higher (e.g., one thousand times higher) than field values received from external sources (e.g., a CRM or MAP system), to ensure that the operator's field values always wins when they conflict with field values from other sources. In an embodiment, the weights may be tiered, with the weight for the operator's data in a first tier (e.g., virtually guaranteed to win when present in the voting process), the weights for data vendors' data in a second tier (i.e., lower than the first tier) and differentiated based on firmographic quality, the weights for user-provided data (e.g., from a CRM or MAP system) in a third tier (i.e., lower than the first and second tiers), and the weights for other data (e.g., contact-level and lead-level records) in a fourth tier (i.e., lower than the first, second, and third tiers, and virtually guaranteed to lose if conflicting with any record in a higher tier). The weights may be generated and vetted automatically and/or with human assistance, and may be continually adjusted or may be fixed and subjected to periodic review and revision. In general, a weight associated with a given source may be adjusted upward if the field values it provides frequently match the ground truth (e.g., based on one or more statistical measures), and downward if the field values it provides infrequently match the ground truth (e.g., based on one or more statistical measures).

In an embodiment, one or more sources may be excluded from the voting process. In other words, records from these source(s) are not given any votes during the voting process. As an example, data from IP-to-company mapping systems may be excluded, since they generally do not comprise firmographic field values. Rather, this data may be used to map an IP address in a firmographic record from another source to a particular value to be inserted into a blank or missing company-name field or country field in that firmographic record. As another example, firmographic records from a test source may be excluded from the voting process.

In an embodiment, one or more firmographic records may be excluded from the voting process based on any exclusion criteria that have been updated (e.g., added or changed) since subprocess 330. This may be useful when there is significant latency between subprocesses 330 and 350, as may be the case when subprocess 350 is only performed periodically (e.g., once a day) after a certain cut-off time for receiving user-provided firmographic information.

The conflated firmographic record at each group level may comprise different sets of relevant fields than the conflated firmographic record at other group levels. For example, a site revenue field, representing the revenue for a company's office in a certain city, is only relevant for the conflated firmographic record at the city level. Thus, the application may only elect a value for the site revenue field in the conflated firmographic records at the city level. In addition, the value of one or more fields at higher group levels for a particular company may be filled in based on the values of those field(s) at lower group levels, and vice versa. For example, the city location of each conflated firmographic record will be unique at the city level. The location in the conflated firmographic record at the global level for a company may be determined based on the city location in the conflated firmographic records for that company at the city level that is most likely the headquarters or main location of the company. This location may be selected based on available data regarding the company's headquarters (e.g., provided by a data source) or based on a statistical distribution (e.g., the most frequently occurring location for the company name in the cluster of firmographic records may be selected as the headquarters). As another example, an industry field, representing the industry in which a company is engaged, should be elected at the global level, since the industry field will typically apply to the firmographic records at every level. Thus, the application may only elect a value for the industry field in the conflated firmographic records at the global level. Every lower-level conflated firmographic record may inherit the values of fields in its higher-level conflated firmographic records. Accordingly, the value of the industry field at the global level may be inherited by all of the conflated firmographic records at each of the country, state, and city levels.

In subprocess 360, a master identifier is generated for each conflated firmographic record. While subprocess 360 is illustrated after subprocess 350, it should be understood that subprocess 360 may be performed before or during subprocess 350. In any case, subprocess 360 should generally be performed after subprocess 340 to ensure that the master identifiers are generated from the highest quality data (i.e., normalized, filtered, and/or cleaned firmographic information).

In an embodiment, the master identifier of each conflated firmographic record at each group level may be a function of the GROUP BY fields as inputs. For example, the master identifier of the conflated firmographic record at the global level may be a function of the key field, the master identifier of the conflated firmographic record at the country level may be a function of the key and country fields, the master identifier of the conflated firmographic record at the state level may be a function of the key, country, and state fields, and the master identifier of the conflated firmographic record at the city level may be a function of the key, country, and city fields. In an embodiment, the function defines a one-to-one correspondence between the master identifier and the relevant fields. Each master identifier may comprise a unique character string (e.g., alphanumeric string). Subprocesses 350 and 360 ensure that each company has only one master identifier. For example, the master identifier may be generated as a hash of its inputs or in any known manner.

As discussed above, the application may treat franchisees as a special case during voting. Thus, the application may also treat franchisees as a special case when generating master identifiers. Specifically, in an embodiment, a master identifier is generated for the franchiser and a subordinate identifier is generated for each franchisee. The master identifier may be generated, as described elsewhere herein, for example, as a function of the domain name, if available, or the company name of the franchiser, if the domain name is not available. Each subordinate identifier may be generated as a function of the company name of the respective franchisee (e.g., since the domain name is not unique). Then, the master identifier for each franchisee is a function (e.g., concatenation) of both the master identifier of the franchiser and the subordinate identifier of that franchisee. In other words, each franchisee inherits the master identifier of its franchiser and also has its own unique subordinate identifier. For example, the master identifier for the franchiser Subway may be generated as a hash function of the DNC tuple (subway.com, Subway, USA) to produce the master identifier "8d981c0e25594d8". The subordinate identifier for a franchisee, Alexander's Subway, may be generated as a hash function of the DNC tuple (subway.com, Alexanders Subway, USA) to produce the subordinate identifier "838c80a86647b66". In this case, the master identifier for the franchisee, Alexander's Subway, is a composite master identifier, "8d981c0e25594d8.838c80a86647b66", which is generated by appending the subordinate identifier of the franchisee to the master identifier of the franchiser (e.g., with a period between the two sub-identifiers).

In subprocess 370, a quality filter may be applied to the conflated firmographic records that result from the voting in subprocess 350. In an embodiment, the quality filter utilizes the strengths or reliability of the sources of the data from which each aggregate firmographic record was produced. For example, a weight may be assigned to each source based on that source's accuracy, and the weights of each source that contribute to a particular conflated firmographic record may be combined to determine an overall strength of that conflated firmographic record. As one example, data that has been curated by the operator of platform 110 may be weighted higher than data received from any other sources. Conflated firmographic records, whose strengths do not exceed a particular threshold value, may be filtered out or excluded from further processing.

As another example, a threshold number of contributing sources or records may be required for a conflated firmographic record to be merged into the master firmographic database. Any conflated firmographic record that was not produced from firmographic records that, collectively, were received from the threshold number of contributing sources or satisfy the threshold number of records may be filtered out or excluded. In other words, in an embodiment, a threshold amount of corroboration is required before a conflated firmographic record is added to the master firmographic database. Thus, if a conflated firmographic record is supported by only a single source or a few firmographic records in the data received in subprocess 310, that conflated firmographic record may be excluded as not sufficiently reliable. In an embodiment, the threshold may be a percentage of the supporting sources relative to all sources from which records were received in subprocess 310, a percentage of supporting records relative to all records received in subprocess 310, and/or the like.

In subprocess 380, the final set of firmographic records may be merged into the master firmographic database as mastered firmographic records. In an embodiment, each mastered firmographic record in the master firmographic database comprises fields for a global master identifier (e.g., a function of the domain name if available, or company name if the domain name is not available), country master identifier, domain name, company name, region identifier, country, state, city, Zip code, address, telephone number, one or more industry codes (e.g., North American Industry Classification System (NAICS) code, Standard Industrial Classification (SIC) code, operator's proprietary classification), revenue (e.g., a range and/or a specific number if available), number of employees (e.g., a range and/or specific number if available), LinkedIn™ identifier, Facebook™ identifier, Twitter™ identifier, logo, and/or the like. The mastered firmographic records may be merged into the master firmographic database at each of a plurality of levels, such as the global level, country level, state level, and city level. The master firmographic database may comprise separate tables for each level, since each level may comprise different fields (i.e., table columns). Users may query the master firmographic database to retrieve mastered firmographic records for one or more companies of interest.

Alternatively or additionally, in an embodiment, each user of platform 110 may be associated with its own subset of mastered firmographic records from the master firmographic database. A user may be a customer of platform 110, and a customer may be an enterprise that provides and/or markets a product or service. For example, a particular user may only be interested in a subset of the companies represented in the master firmographic database. In this case, a user-specific firmographic database may be created and maintained in association with each user. Each user-specific firmographic database may be updated with relevant mastered firmographic records that survived the quality filter in subprocess 370. In other words, the mastered firmographic records may be merged into the master firmographic database, and a subset of those mastered firmographic records that are relevant to each user may be merged into that user's user-specific firmographic database. Alternatively, the application may extract the subset of mastered firmographic records, which are relevant to the user, from the master firmographic database and provide the extracted subset to the user.

It should be understood that the subset of mastered firmographic records that are provided to users may comprise firmographic records at one or more of the group levels that are of interest to that user (e.g., global, country, state, city). For example, a particular user may only be interested in firmographic records at the global level. In this case, the subset that is provided to that user will only consist of global-level mastered firmographic records.

Each mastered firmographic record in the master firmographic database and in the user-specific subsets may represent a company. In addition, each mastered firmographic record in a user-specific subset may represent a company that is represented in a CRM or MAP system of the user. Thus, the subset of mastered firmographic records that is relevant to the user may be exported to or merged into the user's CRM or MAP system. A user may utilize this feature to clean up, supplement, and/or enrich the user's own firmographic records. The user may also utilize the subset of conflated firmographic records in other downstream services, for example, related to business development, marketing, advertising, and/or the like.

The application may also provide insights to the operator of platform 110 and/or the users of platform 110. For example, the application may utilize the master firmographic database to tie anonymous online activities to specific master identifiers (e.g., by matching an IP address or domain name in online activities to an IP address or domain name associated with a particular master identifier in the master firmographic database). Consequently, online activities, which might otherwise be anonymous, can be associated to a specific company. In other words, in an embodiment, the master firmographic database can be used to de-anonymize anonymous online activities at the company level, such as Internet activities which are notoriously anonymous. These de-anonymized online activities can then be used in sales intelligence (e.g., targeted marketing, calculating the effectiveness of a marketing campaign, etc.) or other downstream activities by the operator of platform 110 and/or the users. As another example, a user may have a plurality of accounts in the user's CRM system, and the subset of mastered firmographic records may provide the insight that, based on matches in field values between the accounts in the user's CRM system and a mastered firmographic record, all of these separate accounts actually represent a single company. The user can leverage this knowledge to derive further insights about that company. It should be understood that the application may provide the sales intelligence to users through one or more screens of a graphical user interface generated by the application (e.g., and rendered on a user system 130).

While a number of the subprocesses in process 300 have been described with respect to specific fields, such as domain name, company name, and country, it should be understood that other fields may be used in alternative embodiments. For example, clustering in subprocess 350 may be performed using tuples of other fields. In addition, the master identifiers may be generated in subprocess 360 using other fields.

2.2. Rule-Based Normalization and Filtering

As discussed above, in subprocesses 320 and 330, criteria may be used to exclude or clean certain data. Such criteria may be used to remedy low-volume or infrequent situations or situations that are too difficult for algorithms to detect. Examples of such criteria include:

(1) An exclusion rule (e.g., in subprocess 330) to exclude DN tuples—i.e., (domain name, company name) tuples—that are clearly wrong. An example of a clearly wrong DN tuple is (comcast.com, Bob's Bait and Tackle). In this case, the domain name is likely associated with the Internet service provider (ISP) of the company, rather than the company itself. This rule may be implemented as an exclusion list comprising certain DN tuples, domain names, and/or company names.

(2) An exclusion rule (e.g., in subprocess 330) to exclude tuples that include a country that is clearly wrong. An example of such a tuple is (in-and-out.com, Ethiopia). This rule may be implemented as an exclusion list comprising certain tuples, domain names, and/or countries.

(3) An exclusion rule (e.g., in subprocess 330) to exclude tuples that include a company name that comprises a keyword that indicates that the field contains junk data. Examples of such keywords include "TESTACCOUNT", "NOTACOMPANY", "WEBTRIAL", and the like. These keywords frequently occur in data from form-fill sources, as a result of visitors filling in web forms without serious intent. This rule may be implemented as an exclusion list comprising certain keywords.

(4) A normalization rule (e.g., in subprocess 320) that removes terms that mean "company" or other forms of legal entities from company names. For example, the term "Corp" should be removed from all company names, such that "Intel Corp" and "Intel" have the same standardized form. This rule may be implemented as a list comprising certain terms, in various forms or represented as regular expressions, that should be removed.

(5) A normalization rule (e.g., in subprocess 320) that standardizes certain domain names that require special treatment. For instance, domain names for websites that host subdomains should be standardized to the subdomains, rather than the domain. As an example, the subdomain "*.abc.wix.com" should be standardized to "abc.wix.com" rather than "wix.com". This rule may be implemented as a list comprising certain domains that should not be shortened beyond the subdomain.

(6) A normalization rule (e.g., in subprocess 320) that performs certain verbatim transformations that cannot be sensibly handled via algorithms. This rule may be implemented as a list of transformations. A transformation may comprise replacing a certain keyword or phrase with another keyword or phrase. Each keyword or phrase to be replaced may be represented as a character string or regular expression.

When a firmographic record comprises data that matches a normalization rule, the firmographic record may be altered according to the normalization rule. When a firmographic record comprises data that matches an exclusion rule, the data that matches the exclusion rule may be deleted from or replaced in the firmographic record. Alternatively, in some cases, when a firmographic record comprises data that matches certain exclusion rules, the entire firmographic record may be excluded from further processing.

2.3. Verification Process for Data Improvement

In an embodiment, the master firmographic database may be refined by user feedback and data curation by the operator of platform 110. For instance, the graphical user interface of the application may comprise one or more inputs for submitting corrections to data in the master firmographic database. As an example, a user may submit a search query to the master firmographic database and view the search results in the graphical user interface. Each firmographic record in the search results may be associated with an input for flagging the firmographic record (e.g., an attribute for the company is not correct) and/or submitting a correction (e.g., an attribute for the company should be a specified value). For example, a user may flag a firmographic record for Intel Semiconductors that incorrectly comprises "oil and gas" as the industry. As another example, a user may submit a correction to change the revenue in a firmographic record for IBM from "$1B+" to "$5B+". The application may map flags to corrections, such that, in response to an attribute in a firmographic record being flagged, the application may prompt a curator to input the correct value for the attribute.

The application may route any feedback for a firmographic record through one or more levels of verification before the firmographic record is updated in the master firmographic database. In an embodiment, the feedback is required to go through a plurality of levels of verification by multiple users via role-based access. Each role of a user involved in the verification process may be assigned a different weight. The weights of the roles of all users may be combined (e.g., by a sum or other combination, with approvals strengthening the feedback and/or disapprovals weakening the feedback), and the result may be compared to a threshold. Once the result satisfies the threshold, the feedback may be verified, and the master firmographic database may be updated with the feedback, which may comprise corrective data. Conversely, for as long as the result does not satisfy the threshold, the feedback is not verified, and the master firmographic database is not updated. A role of data specialist may have a higher associated weight than a role of non-specialist. Thus, feedback verified by a data specialist would require fewer verifications than feedback verified by a non-specialist. The weights associated with certain roles, such as a product manager or data engineer, may be set high enough that verification by a single user with that role will verify the feedback without any other verifications required. This role-based verification process enables continual data improvement, while balancing concerns for accuracy.

Data may be improved by various sources. For example, users of platform 110 (i.e., who utilize the master firmographic database for their business) may flag errors and suggest corrections, as discussed above, as well as specify entries (e.g., tuples) to be added to exclusion lists. The operator of platform 110 may utilize datasets to identify and remove junk data, submit corrections, identify and account for domain redirection and aliasing, add geographical data, curate exclusion lists, and/or the like. In addition, data may be crowd-sourced and/or scraped. Crowd-sourced data (i.e., derived from information obtained by a large group of people) may be used to correct errors in the data, as well as to supply firmographic records. Scraped data (e.g., derived from web-crawls) may be used to identify domain redirections, as well as to supply firmographic records. All of the data from all the sources may undergo the disclosed verification process, which may comprise human effort and/or automation, multiple levels of verification, role-based human involvement via the graphical user interface of the application, and/or the like. Firmographic data that is fully verified through the verification process can then be incorporated into the master firmographic database, whereas unverified or partially verified firmographic data is not incorporated into the master firmographic database.

In an embodiment, the application may periodically analyze the master firmographic database to detect stale firmographic records. Stale firmographic records may be deleted or flagged (e.g., for human review). In addition, the application may periodically scrape and parse firmographic data from various public sources or private vendors (e.g., external systems 140). With the disclosed embodiments, it is easy to adapt platform 110 to acquire firmographic data from new sources and in new formats.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive data comprising a plurality of firmographic records from a plurality of sources, wherein each of the plurality of firmographic records comprises a plurality of fields;
   normalize the plurality of firmographic records into a common schema;
   clean the plurality of firmographic records by replacing a value of each of one or more of the plurality of fields in one or more of the plurality of firmographic records with a value of that field in another one of the plurality of firmographic records, wherein cleaning the plurality of firmographic records comprises
      classifying each of the plurality of firmographic records into one of a plurality of categories, wherein the plurality of categories comprises a strong category, a neutral category, and a weak category, and wherein classifying each of the plurality of firmographic records into one of a plurality of categories comprises, for each of the plurality of firmographic records,
         calculating a first strength of a first value for a first field in the firmographic record within a first dimension defined by a second value for a second field in the firmographic record and a third value for a third field in the firmographic record,
         calculating a second strength of the second value within a second dimension defined by the first value and the third value,
         when the first strength and the second strength both satisfy a respective strong criterion, classifying the firmographic record into the strong category,
         when the first strength and the second strength both satisfy a respective weak criterion, classifying the firmographic record into the weak category, and,
         when the first strength and the second strength do not both satisfy the respective strong criterion and do not both satisfy the respective weak criterion, classifying the firmographic record into the neutral category, and,
      for each of one or more of the plurality of firmographic records that are classified into the weak category, replacing the value of each of one or more of the plurality of fields in that firmographic record with the value of that field in one of the plurality of firmographic records that is classified into the strong category,
      wherein none of the values of the plurality of fields in the plurality of firmographic records that are classified into the neutral category are replaced during the cleaning;
   cluster the plurality of firmographic records into a plurality of clusters, wherein each of the plurality of clusters comprises a subset of the plurality of firmographic records;
   for each of the plurality of clusters, collapse the subset of firmographic records in that cluster into a single conflated firmographic record based on a voting process within that cluster;
   generate a master identifier for each conflated firmographic record; and
   merge the conflated firmographic records into a master firmographic database, comprising a plurality of mastered firmographic records, indexed by the master identifiers.

2. The method of claim 1, further comprising using the at least one hardware processor to, after receiving the data and prior to clustering the plurality of firmographic records, filter the plurality of firmographic records according to one or more exclusion criteria.

3. The method of claim 1, further comprising using the at least one hardware processor to:
   identify a subset of the plurality of mastered firmographic records that is associated with a user; and
   provide the identified subset to the user.

4. The method of claim 1, wherein normalizing the plurality of firmographic records into a common schema comprises standardizing values of one or more of the plurality of fields in the plurality of firmographic records.

5. The method of claim 1, wherein the first field is a domain name, and wherein the second field is a company name.

6. The method of claim 5, wherein the third field is a country.

7. The method of claim 1, wherein the strong criterion is a first threshold value, and wherein the weak criterion is a second threshold value that is different than the first threshold value.

8. The method of claim 1, wherein calculating the first strength comprises calculating a histogram weight indicating a frequency that the first value for the first field occurs in the plurality of firmographic records in the first dimension, and wherein calculating the second strength comprises calculating a histogram weight indicating a frequency that the second value for the second field occurs in the plurality of firmographic records in the second dimension.

9. The method of claim 1, wherein clustering the plurality of firmographic records into a plurality of clusters comprises, for each of a plurality of values of a key, grouping the plurality of firmographic records having that value of the key into a cluster.

10. The method of claim 9, wherein the plurality of fields comprises a domain name and a company name, and wherein, for each of the plurality of firmographic records, the value of the key for that firmographic record is determined as:
when the firmographic record comprises a value for the domain name, the value for the domain name; and,
when the firmographic record does not comprise a value for the domain name, a value for the company name.

11. The method of claim 1, wherein clustering the plurality of firmographic records into a plurality of clusters comprises, for each of a plurality of values of a key and each of a plurality of values of at least one of the plurality of fields, grouping the plurality of firmographic records having that value of the key and that value of the at least one field into a cluster.

12. The method of claim 11, wherein the at least one field comprises one or more of a country, state, or city.

13. The method of claim 1, wherein the plurality of fields comprises a domain name and a company name, and wherein generating the master identifier for each conflated firmographic record comprises:
when the conflated firmographic record comprises a value for the domain name, generating the master identifier as a function of the value for the domain name; and,
when the conflated firmographic record does not comprise a value for the domain name, generating the master identifier as a function of a value for the company name.

14. The method of claim 1, further comprising using the at least one hardware processor to, before merging the conflated firmographic records into the master firmographic database, filtering out each of one or more of the conflated firmographic records based on a reliability of the plurality of sources that contributed the subset of firmographic records that were collapsed into that conflated firmographic record.

15. A method of comprising using at least one hardware processor to:
receive data comprising a plurality of firmographic records from a plurality of sources, wherein each of the plurality of firmographic records comprises a plurality of fields, wherein the plurality of fields comprises a domain name and a company name;
normalize the plurality of firmographic records into a common schema;
clean the plurality of firmographic records by replacing a value of each of one or more of the plurality of fields in one or more of the plurality of firmographic records with a value of that field in another one of the plurality of firmographic records;
cluster the plurality of firmographic records into a plurality of clusters, wherein each of the plurality of clusters comprises a subset of the plurality of firmographic records;
for each of the plurality of clusters, collapse the subset of firmographic records in that cluster into a single conflated firmographic record based on a voting process within that cluster;
generate a master identifier for each conflated firmographic record, wherein generating the master identifier for each conflated firmographic record comprises
when the conflated firmographic record represents a franchiser,
when the conflated firmographic record comprises a value for the domain name, generating the master identifier as a function of the value for the domain name, and,
when the conflated firmographic record does not comprise a value for the domain name, generating the master identifier as a function of a value for the company name, and,
when the conflated firmographic record represents a franchisee,
generating a subordinate identifier as a function of the value for the company name, and
generating the master identifier as a function of the master identifier of a franchiser of the franchisee and the subordinate identifier; and
merge the conflated firmographic records into a master firmographic database, comprising a plurality of mastered firmographic records, indexed by the master identifiers.

16. A system comprising:
at least one hardware processor; and
one or more software modules that are configured to, when executed by the at least one hardware processor,
receive data comprising a plurality of firmographic records from a plurality of sources, wherein each of the plurality of firmographic records comprises a plurality of fields,
normalize the plurality of firmographic records into a common schema,
clean the plurality of firmographic records by replacing a value of each of one or more of the plurality of fields in one or more of the plurality of firmographic records with a value of that field in another one of the plurality of firmographic records, wherein cleaning the plurality of firmographic records comprises
classifying each of the plurality of firmographic records into one of a plurality of categories, wherein the plurality of categories comprises a strong category, a neutral category, and a weak category, and wherein classifying each of the plurality of firmographic records into one of a plurality of categories comprises, for each of the plurality of firmographic records,
calculating a first strength of a first value for a first field in the firmographic record within a first dimension defined by a second value for a second field in the firmographic record and a third value for a third field in the firmographic record,
calculating a second strength of the second value within a second dimension defined by the first value and the third value,
when the first strength and the second strength both satisfy a respective strong criterion, classifying the firmographic record into the strong category,
when the first strength and the second strength both satisfy a respective weak criterion, classifying the firmographic record into the weak category, and,
when the first strength and the second strength do not both satisfy the respective strong criterion and do not both satisfy the respective weak criterion, classifying the firmographic record into the neutral category, and,
for each of one or more of the plurality of firmographic records that are classified into the weak category, replacing the value of each of one or more of the plurality of fields in that firmographic record with the value of that field in one of the plurality of firmographic records that is classified into the strong category, wherein none of the values of the plurality of fields in the plurality of firmographic records that are classified into the neutral category are replaced during the cleaning, cluster the plurality of firmographic records into a plurality of clusters, wherein each of the plurality of clusters comprises a subset of the plurality of firmographic records, for each of the plurality of clusters, collapse the subset of firmographic records in that cluster into a single conflated firmographic record based on a voting process within that cluster, generate a master identifier for each conflated firmographic record, and merge the conflated firmographic records into a master firmographic database, comprising a plurality of mastered firmographic records, based on the master identifiers.

17. A non-transitory computer-readable medium having instructions stored therein, wherein the instructions, when executed by a processor, cause the processor to:

receive data comprising a plurality of firmographic records from a plurality of sources, wherein each of the plurality of firmographic records comprises a plurality of fields;

normalize the plurality of firmographic records into a common schema;

clean the plurality of firmographic records by replacing a value of each of one or more of the plurality of fields in one or more of the plurality of firmographic records with a value of that field in another one of the plurality of firmographic records, wherein cleaning the plurality of firmographic records comprises classifying each of the plurality of firmographic records into one of a plurality of categories, wherein the plurality of categories comprises a strong category, a neutral category, and a weak category, and wherein classifying each of the plurality of firmographic records into one of a plurality of categories comprises, for each of the plurality of firmographic records, calculating a first strength of a first value for a first field in the firmographic record within a first dimension defined by a second value for a second field in the firmographic record and a third value for a third field in the firmographic record, calculating a second strength of the second value within a second dimension defined by the first value and the third value, when the first strength and the second strength both satisfy a respective strong criterion, classifying the firmographic record into the strong category, when the first strength and the second strength both satisfy a respective weak criterion, classifying the firmographic record into the weak category, and, when the first strength and the second strength do not both satisfy the respective strong criterion and do not both satisfy the respective weak criterion, classifying the firmographic record into the neutral category, and, for each of one or more of the plurality of firmographic records that are classified into the weak category, replacing the value of each of one or more of the plurality of fields in that firmographic record with the value of that field in one of the plurality of firmographic records that is classified into the strong category, wherein none of the values of the plurality of fields in the plurality of firmographic records that are classified into the neutral category are replaced during the cleaning;

cluster the plurality of firmographic records into a plurality of clusters, wherein each of the plurality of clusters comprises a subset of the plurality of firmographic records;

for each of the plurality of clusters, collapse the subset of firmographic records in that cluster into a single conflated firmographic record based on a voting process within that cluster;

generate a master identifier for each conflated firmographic record; and merge the conflated firmographic records into a master firmographic database, comprising a plurality of mastered firmographic records, indexed by the master identifiers.

* * * * *